United States Patent [19]

Fer

[11] Patent Number: 4,859,088
[45] Date of Patent: Aug. 22, 1989

[54] THRUST BEARING

[76] Inventor: Richard A. Fer, 8449 - 7th St., Downey, Calif. 90241

[21] Appl. No.: 285,751

[22] Filed: Dec. 16, 1988

[51] Int. Cl.4 ............................................. F16C 17/08
[52] U.S. Cl. .................................... 384/371; 384/426
[58] Field of Search ............... 384/371, 426, 425, 369, 384/368, 425

[56]     References Cited
    U.S. PATENT DOCUMENTS

| 1,094,535 | 4/1914 | Cooper | 384/426 |
| 3,070,347 | 12/1962 | Ball | 384/426 |
| 3,399,007 | 8/1968 | Remmers et al. | 384/371 |
| 4,130,325 | 12/1978 | Schultenkämper | 384/425 |

Primary Examiner—Lenard A. Footland
Attorney, Agent, or Firm—I. Michael Bak-Boychuk

[57] ABSTRACT

A thrust bearing assembly including a tubular mount conformed to receive an axially loaded shaft, the shaft being formed as a cylindrical shank terminating in a circular cap receivable in the interior of the mount. A selected number of rings is then stacked onto the shank to transfer lateral loads to the mount with a complementary number of discs being inserted below the cap for taking out axial loads. Each of the discs, furthermore, include oppositely arced grooves on the faces thereof for dynamic pumping of lubricating oil conveyed through the shaft.

5 Claims, 1 Drawing Sheet

THRUST BEARING

BACKGROUND OF THE INVENTION

FIELD OF THE INVENTION

The present invention relates to rotary supports and more particularly to thrust bearing arrangements conformed to provide center supports for rotary platforms.

DESCRIPTION OF THE PRIOR ART

Thrust bearings of various forms have been devised in the past. Typically such thrust bearings are effected either by rolling contact or by fluid film in order to reduce the rotary friction of an axially loaded device. In either form the radial components of contact force or fluid translation consistently provide force inequalities which increase rotary friction.

In consequence, various techniques were devised in the past which attempted to reduce the radial force or film distribution equality, as exemplified by the teachings in U.S. Pat. Nos. 4,275,938 to Roberts, 1,786,565 to Freeman, and 1,905,443 to Cope et al. While suitable for their purposes each of the foregoing teachings relies on the general properties of lubricating fluids to effect the results.

Optimization of the film flow patterns of a fluid film in a thrust bearing is thus desired and it is one such technique that is disclosed herein.

SUMMARY OF THE INVENTION

Accordingly, it is the general purpose and object of the present invention to provide a thrust bearing assembly in which the tangential components of film shear are used to advantage in developing film thickness.

Other objects of the invention are to provide a thrust bearing which is selectively modified for axial and lateral loads.

Yet further objects of the invention are to provide a thrust bearing assembly which is convenient in use and in the maintenance thereof.

Briefly, these and other objects are accomplished within the present invention by providing a cylindrical casing drilled or formed to include a central bore in which a plurality of annular thrust discs are stacked subjacent an enlarged cap at the end of a loaded shaft. The lateral shaft surfaces above the cap are then received in the interior of a plurality of ring spacers each of a thickness equal to the thickness of a disc. Thus the depth of receipt of the shaft within the interior of the casing may be controlled by the selected complement of discs and rings.

The shaft, in turn, may be provided with an axial lubrication bore communicating with a plurality of radial drillings spaced to align with the mating surfaces between the ring spacers. This same bore extends through the cap to communicate with the annuli of the stacked discs. Thus lubricating fluid passes to each disk below the shaft and through the lateral drillings to the rings around the shaft. This lubricating fluid is characterised by some viscosity and is preferrably a lubricating oil like that useful in lubricating hypoid gears. Of course, the gravity and weight of the lubricating oil is selected for the loads and fluid rates to which it is exposed.

In order to provide a fluid transport mechanism for developing a fluid film throughout the disc mating surfaces, each disc includes on the faces thereof an arcuate groove shaped as a circular segment with the segment direction on one face being opposite to the groove direction at the other face. In each instance the groove arc passes through the disc annulus and is thus exposed to the lubricating fluid coming down the shaft.

One should note that the course of rotary motion of one disc relative an other adjacent disc will entail radially increasing rate differentials at the mating faces. Thus the selective surface rate at the exterior ranks of the disc face will be greater than that at the interior. Since ordinarily viscous shear exchanges with film thickness such a radial rate pattern has heretofore resulted in excessive film thinning at the disc edges.

By providing grooves formed as arc segments the peripheral viscous shear is converted to a dynamic head and viscous fluid pumping results along the groove. Thus the radial speed inequality is used to advantage for fluid pumping to carry the fluid to the areas of highest shear. Of course both the interior and exterior edges of each disc and ring chamfored to enlarge the surface picking up the lubricating fluid.

In this manner a conveniently adjusted thrust bearing is devised which effectively accommodates the bending and axial design criteria.

DESCRIPTION OF THE SPECIFIC EMBODIMENT

Figure 1:
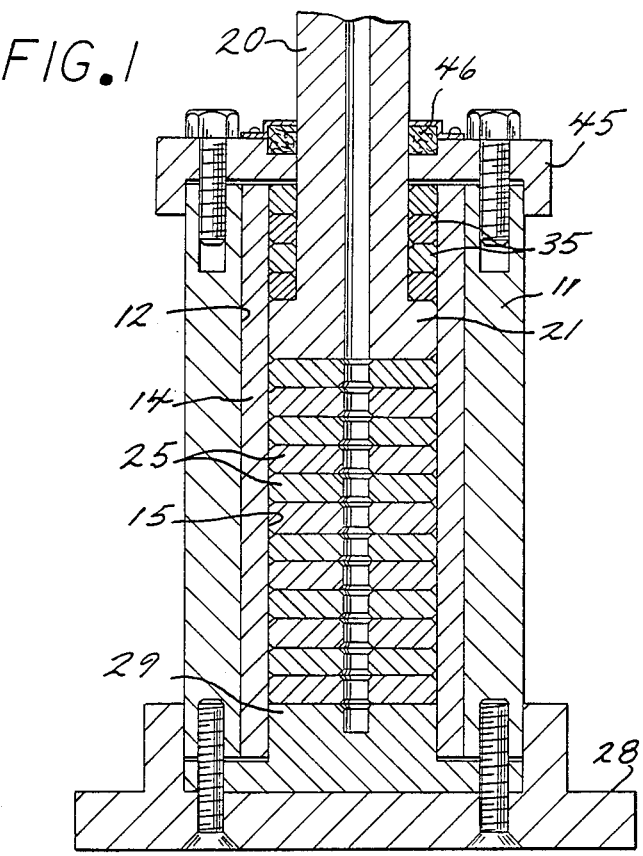
FIG. 1 is a sectional side view in section, of the inventive thrust bearing constructed according to the invention herein.
Figure 3:
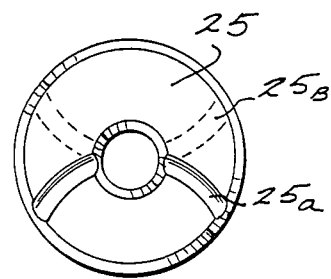
FIG. 3 is a plan view of a disc useful with the invention herein.
Figure 2:
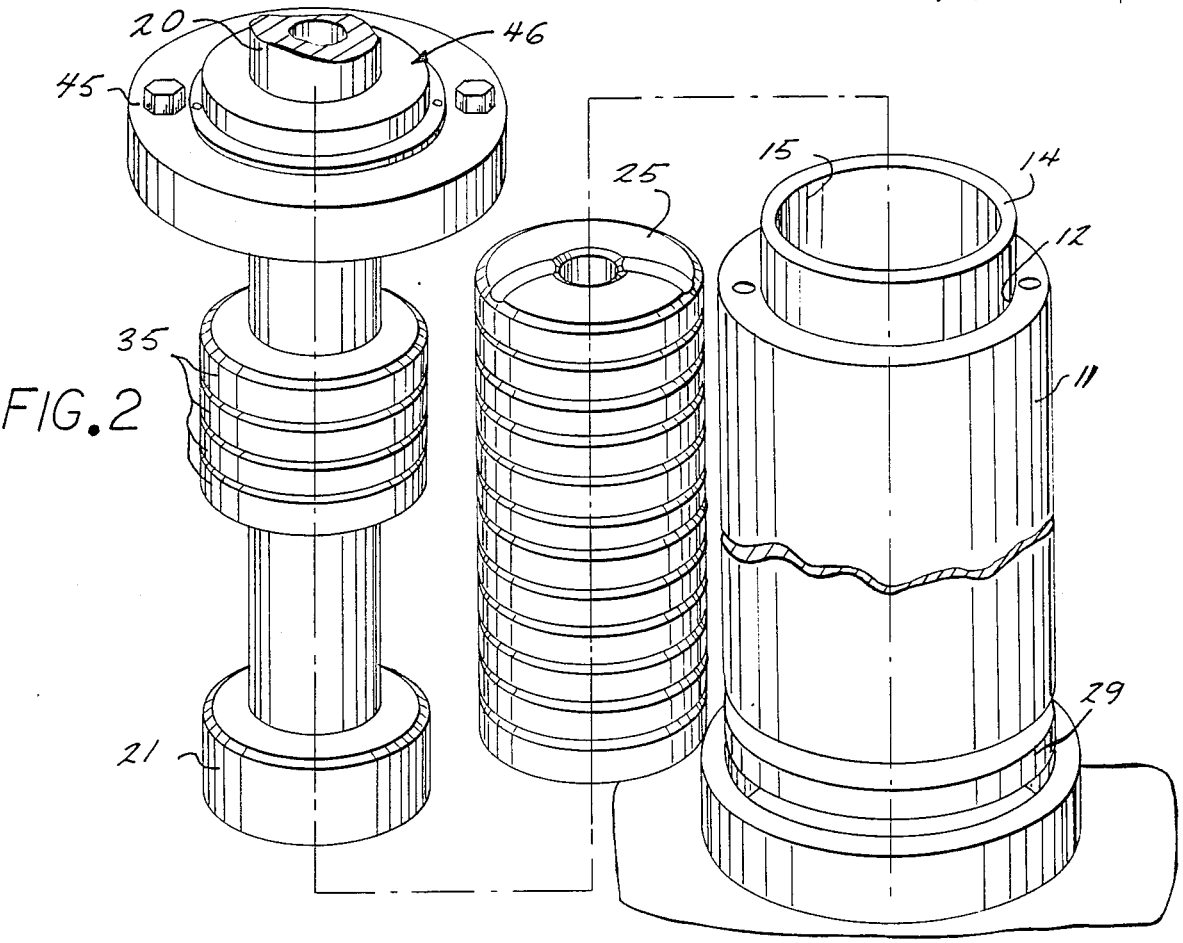
FIG. 2 perspective illustration, separated by parts, of the inventive thrust bearing shown in FIG. 1.

As shown in FIGS. 1–3 the inventive thrust bearing assembly generally designated by the numeral 10 comprises a cylindrical casing 11 provided with a central cavity 12 lined with a sintered bronze insert 14 which when in place is honed to form an accurately dimensioned inner bore 15 shaped for sliding receipt of a circular cap 21 at the end of a shaft 20. In this manner the shaft may be inserted through the top end 17 of bore 15 with the circular cap 21 received therein. A plurality of annular discs 25 are inserted into the bore 15 subjacent cap 21 in a stacked arrangement above a base plug 29, and a further plurality of spacer rings 35 surround the shaft 20 above cap 21.

Both the spacer rings 35 and discs 25 are of equal thickness and are conformed to the interior dimensions of bore 15, the rings being further conformed to the exterior of shaft 20. Thus the depth of insertion of the cap 21 can be selected by the complementary stacked number of discs and the corresponding compensating number of spacer rings.

Once so positioned lubricating oil 0 may be introduced into the assembly by way of an axial drilling 22 extending longitudinally through shaft 20 and communicating through lateral drillings 23 of the interfaces of each ring 35. This same lubricating oil then migrates through the bottom end of drilling 22 into the annuli of discs 25 to be picked up in arcuate grooves 25a and 25b formed on the faces of each disc. In order to provide the lubrication generally described previously the arc direction of groove 25a and 25b is opposed, each groove arc passing through the disc annulus.

Figure 4:
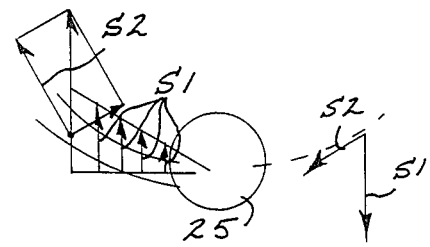
FIG. 4 is a force diagram illustrating the conversion of viscous forces in the present invention.

By reference to FIG. 4 this arcuate groove arrangement resolves the viscous shear force pattern shown by arrows S1 into a component S2 along the groove. Thus the sliding translation of discs 25 relative each other will effect a pumping action of the lubricating oil along the groove. In consequence better lubrication is achieved with better film development between the disc faces. The arcuate form of the grooves, furthermore, insures a limited intersection pattern, thus further reducing rotary friction.

At the tip the cylinder 11 may be fixed to a seal assembly 45 to present a circular seal 46 against shaft 20. Similarly, the bottom end of cylinder 11 may be fixed and sealed against a base plate 28 from which the plug 29 projects.

In this form a thrust bearing assembly is achieved which conveniently accommodates axial and bending loads and which assures the viscous development of lubricating film. This development is further enhanced by chamfers 26 and 36 at the edges of discs 25 and rings 35.

Obviously, many modifications and changes may be made to the foregoing without departing from the spirit of the invention. It is therefore intended that the scope of the invention be determined solely on the claims appended hereto.

What is claimed is:

1. A thrust bearing assembly for supporting a rotary workpiece, comprising
    a tubular mount provided with a base for the support thereof in a vertical alignment;
    a cylindrical shaft conformed for attachment to said workpiece and adapted for insertion into the interior of said tubular mount, said shaft including a cylindrical shank having an upper end proximate said workpiece and a lower end insertable in said tubular mount, said lower end being formed as a circular enlargement receivable in said tubular mount;
    a plurality of rings stacked on the exterior of said shank and conformed for sliding receipt in the interior of said mount; and
    a plurality of discs receivable in a stack in said mount subjacent said enlargement, each said disc having arcuate grooves formed in the faces thereof.

2. Apparatus according to claim 1, wherein:
    said cylindrical shaft includes an axial drilling for conveying lubricating fluid therethrough; and
    said discs include central openings intersecting said grooves for transferring said lubricating fluid from said shaft.

3. Apparatus according to claim 2 wherein:
    said tubular mount includes a sintered metal sleeve in the interior thereof.

4. Apparatus according to claim 1 wherein:
    said rings and said discs are formed to a substantially equal thickness, whereby the depth of receipt of said shaft in said mount is selected by the complementary selection of said rings and said discs.

5. Apparatus according to claim 4 wherein:
    said cylindrical shaft includes an axial drilling for conveying lubricating fluid therethrough;
    said discs include central openings intersecting said grooves for transferring said lubricating fluid from said shaft.

* * * * *